US006536311B2

(12) United States Patent
Heaven

(10) Patent No.: US 6,536,311 B2
(45) Date of Patent: Mar. 25, 2003

(54) MECHANICAL HAND TOOL CALLED THE SWING ARM

(76) Inventor: Jonathan Mark Heaven, 932 Old Dundas Rd, RR #3, Dundas, Ontario (CA), L9H SE3

(*) Notice: Subject to any disclaimer, the term of this patent is extended or adjusted under 35 U.S.C. 154(b) by 0 days.

(21) Appl. No.: 09/960,144

(22) Filed: Sep. 24, 2001

(65) Prior Publication Data

US 2002/0033080 A1 Mar. 21, 2002

Related U.S. Application Data

(60) Provisional application No. 60/232,883, filed on Sep. 15, 2000.

(51) Int. Cl.[7] ................................................ B25B 23/00
(52) U.S. Cl. ............................................ 81/462; 81/57
(58) Field of Search ..................... 81/462, 57, 57.39, 81/57.25, 57.29, 57.41, 58.1, 60, 61

(56) References Cited

U.S. PATENT DOCUMENTS

| | | | | |
|---|---|---|---|---|
| 1,543,338 A | * | 6/1925 | Neal et al. ..................... | 81/58.1 |
| 3,413,877 A | * | 12/1968 | Teichmeier ................. | 81/58.1 |
| 3,905,254 A | | 9/1975 | Palatnick | |
| 3,941,017 A | * | 3/1976 | Lenker et al. ............. | 81/57.39 |
| 3,992,964 A | | 11/1976 | Oshund | |
| 4,063,475 A | | 12/1977 | Peruins | |
| 4,507,989 A | * | 4/1985 | Baker ........................ | 81/57.39 |
| 5,070,749 A | * | 12/1991 | Haviv ........................... | 81/57 |
| 5,074,170 A | | 12/1991 | Shirley | |
| 5,075,914 A | | 12/1991 | Green | |
| 5,123,308 A | | 6/1992 | Shaffer | |
| 5,125,297 A | | 6/1992 | Bai | |
| 5,129,290 A | * | 7/1992 | Haviv ........................... | 81/57 |
| 5,176,047 A | | 1/1993 | Bai | |
| 5,179,876 A | | 1/1993 | Mantilla | |
| 5,309,796 A | * | 5/1994 | Jones ........................ | 81/57.39 |
| 5,616,095 A | | 4/1997 | Pruitt | |
| 5,768,957 A | * | 6/1998 | Baker ........................ | 81/57.39 |

FOREIGN PATENT DOCUMENTS

| | | |
|---|---|---|
| CA | 200950 | 6/1920 |
| CA | 304075 | 9/1930 |
| CA | 535006 | 12/1956 |
| CA | 636706 | 2/1962 |

* cited by examiner

*Primary Examiner*—Joseph J. Hail, III
*Assistant Examiner*—David B. Thomas

(57) ABSTRACT

A tool for loosening or tightening vehicle wheels nuts using a multiplying torque. At one end of the main body there is a rotating shaft the other end sits on the ground to create a resistance platform. The rotating shaft has a nut socket on its end, which engages onto one of the wheel nuts. There is a lever arm parallel to the main body, connected perpendicular with a one directional ratchet system to the rotating shaft. The lever arms opposite end connects to a pry bar which rotates on a pin connected to the main body. When this pry bar is moved back and forth in a winching motion it causes the lever arm to go back and forth. This action in combination with the lever arm ratchet system will turn the rotating shaft in one direction creating multiplying torque on the wheel nut.

4 Claims, 3 Drawing Sheets

MECHANICAL HAND TOOL CALLED THE SWING ARM

This application claims benefit of Prov. No. 60/232,883 filed Sep. 15, 2000.

BACKGROUND OF THE INVENTION

1. Field of the Invention

This invention relates to a hand tool with multiplying force to loosen or tighten wheel nuts on a vehicle.

2. Related Art

A hand tool used in loosening the wheel nuts that a frozen by rust or tightly secured has been exemplified by several patents. Most use gears as like U.S. Pat. No. 3,992,964 in which Osmond discloses a hand tool with coordinated gear assembly and a bracing rod or U.S. Pat. No. 5,179,879 where Mantilla discloses a hand tool with a multiple step down gears making it compact. Or as a variation from gearing there is U.S. Pat. No. 5,129,290 in which Haun uses a hydraulic driven mechanism. These and others are listed for your review.

U.S. Pat. No. 5,616,095 U.S. Pat. No. 5,179,876 U.S. Pat. No. 5,176,047 U.S. Pat. No. 5,129,290 U.S. Pat. No. 5,125,297 U.S. Pat. No. 5,123,308 U.S. Pat. No. 5,075,914 U.S. Pat. No. 5,074,170 U.S. Pat. No. 4,063,475 U.S. Pat. No. 3,992,964 U.S. Pat. No. 3,905,254 U.S. Pat. No. 636,706 U.S. Pat. No. 535,006 U.S. Pat. No. 304,075 U.S. Pat. No. 200,950

BRIEF SUMMARY OF THE INVENTION

It is therefore the object of the present invention to provide a wheel nut loosening and/or tightening system with simple engineering that provides the user with ease, speed and stability. This and other objects will be become apparent from further reading of the detailed descriptions with reference drawings and appended claims.

DESCRIPTION OF THE DRAWINGS

This invention is described with reference to the accompany drawings.

DETAILED DESCRIPTION OF THE PREFERRED EMBODIMENTS

Figure 1:
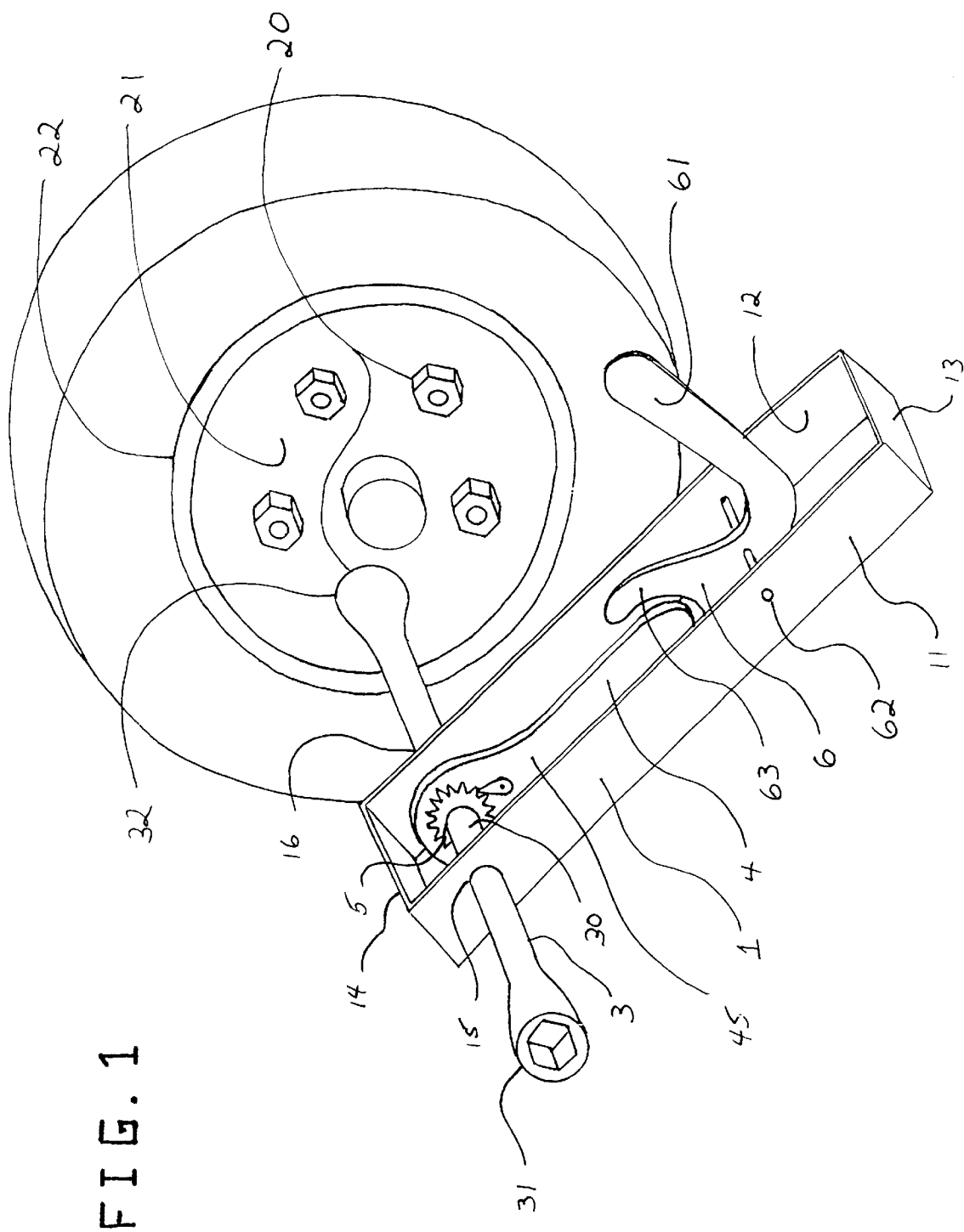
FIG. 1 is a perspective view illustrating the present invention at rest ready to be used for the mechanical operation.

Referring to FIG. 1 and its numbers, which is a perspective drawing of the preferred embodiment at the start of the mechanical operation. This preferred embodiment is a hand tool designed to remove/tighten wheel nuts on the vehicle tires with amplified torque.

The hand tool comprises of a main body 1 that has two metal bars 11 and 12 of equal length running parallel to each other that are connected by spacers 13 and 14 at each end of the main body 1. The spacer 13 is used as a brace when it is placed on the ground during the mechanical operation. There are holes 15 and 16 in each of the metal bars 11 and 12 at the top end of the main body 1. These holes 15 and 16 have a rotating shaft 3 placed through them, perpendicular to the main body 1. These holes 15 and 16 will be referred to as the housing 15 and 16 for the rotating shaft 3.

The rotating shaft 3 meets the main body 1 at the middle of the rotating shafts length 30. There are nut sockets 31 and 32 at each end of the rotating shaft 3 in which one of them is connected onto one of the tire nuts 20 during the mechanical operation. There is a lever bar 4 with one end connected perpendicular to the rotating shaft 3 placed at the middle of the rotating shafts length 30 and in between the two metal bars 11 and 12 of the main body 1.

Where the rotating shaft 3 and the lever bar 4 connects there is a directional ratchet system 5. When force is applied to the lever bar 4 such as moving it back and forth in between the two metal bars 11 and 12 the directional ratchet system 5 will allow the rotating shaft 3 to turn one way in its housing 15 and 16, hence the lever bar 4 and directional ratchet system 5 combination is to be referred to as the ratchet lever bar 45.

The other end of the ratchet lever bar 45 connects into an opposing lever pry bar 6. This lever pry bar 6 has a handle 61 and pivots on a bolt 62 that runs between the two metal bars 11 and 12. There is also a C shaped housing 63 on the lever pry bar 6, as mentioned, that the end of the ratchet lever bar 45 fits into. When the handle 61 is manually moved back and forth which is illustrated with a motion line A in FIG. 2 and a motion line B in FIG. 3, the lever pry bar 6 will pivot on the bolt 62 causing the lever pry bar 6 and the ratchet lever bar 45 to move up and down in conjunction thus creating a draw bridge affect as illustrated with motion line C in FIG. 2 and illustrated with motion line D in FIG. 3, inside/between the two metal bars 11 and 12.

Figure 2:
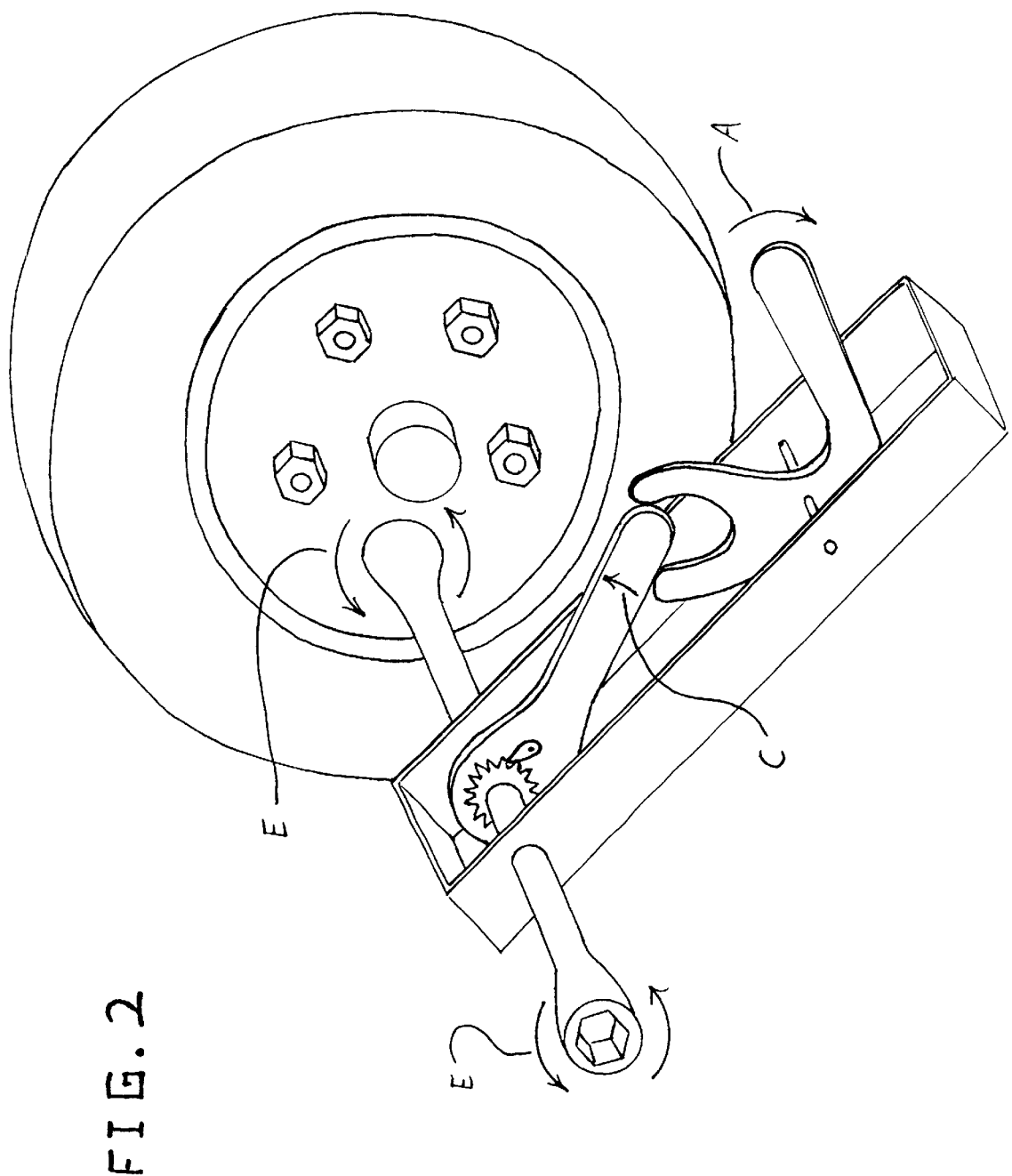
FIG. 2 is a perspective view illustrating the present invention in torque action with motion lines during the mechanical operation.
Figure 3:
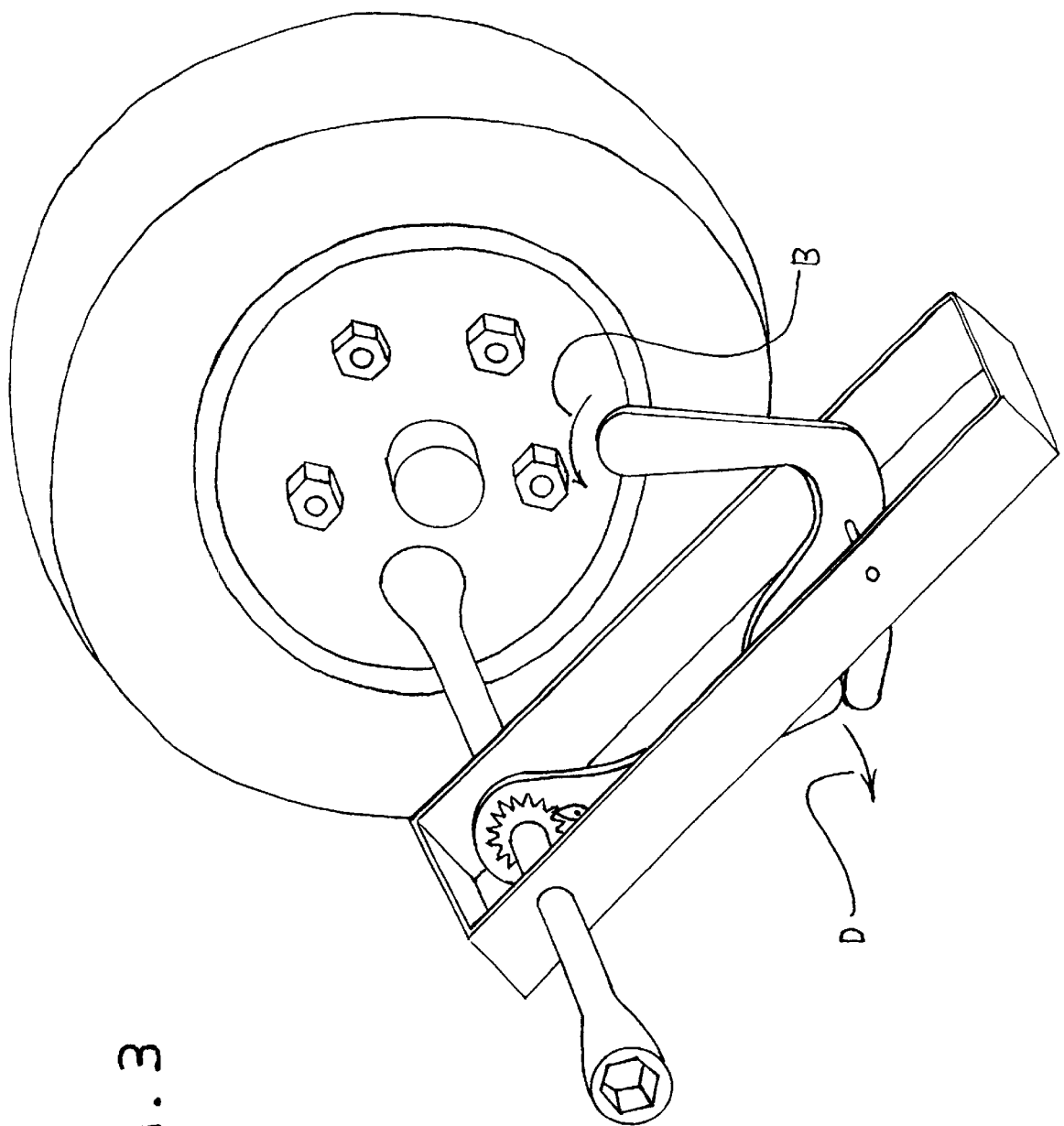
FIG. 3 is a perspective view illustrating the present invention drawn back to start another torque action with motion lines during the mechanical operation.

The rotating shaft 3 rotates in one direction when there is a manual pull up winch action on the ratchet lever bar 45 by the lever pry bar 6, as mentioned, with motion lines A and C in FIG. 2, the downward or return manual winch action, as mentioned, with motion lines B and D in FIG. 3 slips the ratchet lever bar 45 into another gear on the directional ratchet system 5 keeping the rotating shaft 3 stationary and ready for another directional torque movement, as mentioned, with motion lines A and C in FIG. 2.

The lever pry bar 6 is fixed to the main body 1, the main body 1 spacer 13 touches the ground during the mechanical operation, as mentioned, this creates a stationary platform to the directional torque movement created when the lever pry bar 6 is manually winched, moving the ratchet lever bar 45 hence moving the rotating shaft 3 hence as illustrated with motion lines E in FIG. 2 turning the tire nut 20.

There are several factors required for the set up of the mechanical operation of the hand tool, some have been mentioned. Referring to FIG. 1, one; the main body 1 is to be parallel to the tire nut face 21 of the tire rim 22 with the spacer 13 touching the ground to provide a necessary resistance platform, two; the rotating shaft 3 is perpendicular to the tire nut face, three; one of the rotating shaft 3 sockets 31 or 32 is engaged onto one of the tire nuts 20.

To start the mechanical operation of the hand tool the operator holds the nut sockets 31 or 32 end of the rotating shaft 3 that is not engaged on to one of the tire wheel nuts 20 with one hand in order to stabilize the hand tool and with the other hand the operator, as previously described, applies a winching action to the lever pry bar 6 handle 61 this causes a one direction rotating action against the rotating shaft 3 and in turn, turning the tire nut 20 with multiply torque that the nut socket 31 or 32 is engaged onto. One of the nut sockets 31 or 32 engaged onto tire nut 20 will loosen the tire nut 20 the other will tighten the tire nut 20, both with the same mechanical operation.

Those skilled in the art to which this invention relates to are able to do variation in its practice and modes of construction. Thus this invention is not intended to be limited by the illustrative description presented hereinabove, but should be encompassed in the spirit and scope of the appended claims.

What is claimed is:

1. A hand tool with multiplying torque force to loosen and/or tighten threaded nuts such as those on vehicle wheels, comprising:

a main body that has components connected to it; a bottom longitudinal end of said main body acts as a brace when touching a fixed surface such as the ground during the mechanical operation; a rotating shaft extending perpendicular through a housing on a top longitudinal end of the said main body; said rotating shaft has tire nut engaging sockets at each longitudinal end; one of the longitudinal ends of a lever bar is fixed perpendicular to the said rotating shaft with a ratchet system, said ratchet system allows said lever bar to rotate said rotating shaft in one direction in the said housing, the said rotating shaft will remain motionless when the said lever bar is drawn back in the other direction, the other longitudinal end of the said lever bar pinions with a leverage pry bar which pivots on an axis fixed to the said main body, when said leverage pry bar is manually moved back and forth during the mechanical operation it will move the said lever bar up and down creating a drawn bridge effect causing the said lever bar to rotate the said rotating shaft in one direction.

2. A hand tool according to claim 1; wherein said bottom longitudinal end of said main body is a said brace when touching a said fixed surface such as the said ground when one of the said tire nut engaging sockets is connected on to one of the said threaded nuts such as those on said vehicle wheels.

3. A hand tool according to claim 2; wherein coupling of said leverage pry bar with said lever bar will rotate said rotating shaft in the said housing of said main body with multiplying force when said leverage pry bar is manually operated.

4. A hand tool according to claim 3; wherein said rotating shaft acts as a stabilizer bar when held by the user when one of the said tire engaging sockets is connected to one of the said threaded nuts as those on said vehicle wheels.

* * * * *